United States Patent
Ang (10) Patent No.: US 8,031,719 B2
(45) Date of Patent: Oct. 4, 2011

(54) SYSTEM, NODE, AND METHOD OPTIMIZING DATA CONNECTIONS FOR PACKET SERVICES

(75) Inventor: Soon Teck Gibson Ang, Nashua, NH (US)

(73) Assignee: Alcatel Lucent, Paris (FR)

( * ) Notice: Subject to any disclaimer, the term of this patent is extended or adjusted under 35 U.S.C. 154(b) by 332 days.

(21) Appl. No.: 11/814,152

(22) PCT Filed: Jan. 13, 2006

(86) PCT No.: PCT/US2006/001263
§ 371 (c)(1),
(2), (4) Date: Apr. 9, 2009

(87) PCT Pub. No.: WO2006/078562
PCT Pub. Date: Jul. 27, 2006

(65) Prior Publication Data
US 2009/0213784 A1 Aug. 27, 2009

Related U.S. Application Data (60) Provisional application No. 60/644,973, filed on Jan. 19, 2005.

(51) Int. Cl.
*H04L 12/56* (2006.01)
(52) U.S. Cl. ............ 370/395.2; 370/328; 370/329; 370/437
(58) Field of Classification Search .......... None
See application file for complete search history.

(56) References Cited

U.S. PATENT DOCUMENTS

| | | | |
|---|---|---|---|
| 6,473,419 B1 * | 10/2002 | Gray et al. | 370/349 |
| 6,628,954 B1 | 9/2003 | McGowan et al. | |
| 6,671,511 B1 | 12/2003 | Forssell et al. | |
| 7,103,002 B2 | 9/2006 | Bjelland et al. | |
| 2002/0045458 A1 | 4/2002 | Parantainen et al. | |
| 2002/0174212 A1 * | 11/2002 | Casati et al. | 709/223 |
| 2003/0224820 A1 | 12/2003 | Einola et al. | |

FOREIGN PATENT DOCUMENTS

| | | |
|---|---|---|
| EP | 0872982 | 10/1998 |
| WO | WO 00/01173 | 1/2000 |

* cited by examiner

*Primary Examiner* — Donald Mills
(74) *Attorney, Agent, or Firm* — Capitol Patent & Trademark Law Firm, PLLC (57) ABSTRACT

Systems and methods for optimizing resources of a packet service gateway are disclosed. According to an embodiment, a telecommunication system includes a servicing node, a gateway node connecting the servicing node to a data network, and a control node virtualizing the connection of the servicing node to the data network when the connection is inactive for a predetermined period of time. The control node can include a memory storing control information of inactive connections to the data network, and a processor processing and generating requests to and from the servicing node and the gateway node. According to another embodiment, a method of establishing a connection to a data network includes requesting a connection to the data network by a servicing node, connecting the servicing node to the data network via a gateway node, and virtualizing, by a control node, the connection of the servicing node to the data network.

24 Claims, 6 Drawing Sheets

SYSTEM, NODE, AND METHOD OPTIMIZING DATA CONNECTIONS FOR PACKET SERVICES

CROSS-REFERENCES TO RELATED APPLICATIONS

This application claims benefit pursuant to 35 U.S.C. §120 of the filing date of the Provisional Application Ser. No. 60/644,973 filed on Jan. 19, 2005 and titled "Always on optimization for the iGGSN (SGSN, PDSN or any packet service gateway) in order to be cost effective for deployment," which is incorporated herein by reference for all that it discloses.

BACKGROUND OF THE INVENTION

1. Field of the Invention

The present invention generally relates to optimizing resources in a telecommunications system, and more specifically to a system and a method for optimizing resources of a packet service gateway.

2. Description of the Related Art

In a universal mobile telecommunications system (UMTS), a General Packet Radio Service (GPRS) is a packet-based radio communication service, which became available in 2000. The GPRS is known in the art and the specification of the GPRS is provided by 3GPP available at www.3gpp.org, last visited Jan. 3, 2006. The GPRS guarantees mobile devices such as mobile phones and laptops access to the Internet without interruption, at a fast speed. Because of fast data transmission by the GPRS system, users may take part in video conferences, and use a mobile device to perform interactive communication with multimedia web sites. Packets transmitted by a mobile device are provided to the public network through Gateway GPRS Support Nodes (GGSN). The GGSN functions as a gateway that routes packets between the GPRS and the public network.

Figure 1:
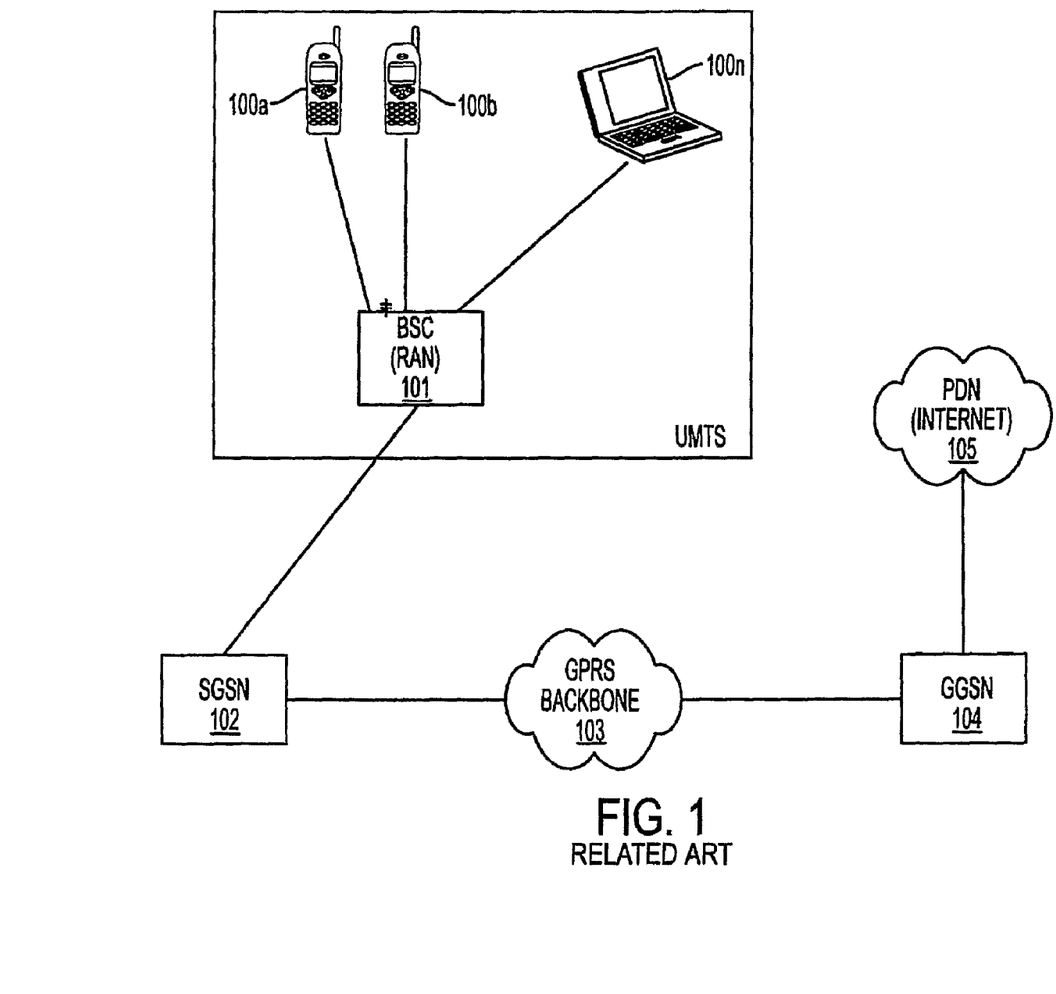
FIG. 1 is a block diagram illustrating a universal mobile telecommunication system (UMTS) connecting to a data network in according to a related art.

As depicted in FIG. 1, the UMTS includes mobile devices 100a, 100b, . . . , 100n and a base station controller (BSC) 101. The mobile devices 100a, 100b, . . . , 100n communicate with the BSC 101 in a GSM system, for example. In a GPRS system, the BSC 101 is connected to a packet control unit (PCU). Alternatively, the PCU of the GPRS system may be included in the BSC 101. The PCU is adjacent to the public network and operates a routing protocol and performs a security function such as a firewall. Other base stations operating in non GPRS system may include a Radio Access Node (RAN) that is used for authentication of packets. For example, the UMTS system has a RAN serving as a base station controller 101.

The BSC 101 is in turn connected to a serving GPRS supporting node (SGSN) 102. The SGSN 102 keeps track of the location of an individual mobile devices 100a, 100b, . . . , 100n and performs security functions and access control. The SGSN 102 also exists to connect the BSC 101 to the GPRS system 103 (depicted as GPRS backbone 103 in FIG. 1), which in turn is connected to the gateway GPRS support node (GGSN) 104. As explained above, the GGSN 104 is a gateway between the GPRS/UMTS network and the public data network (PDN) 105 such as the internet.

In order for the mobile devices 100 to have access to the PDN 105, a connection with the GPRS 103 and the mobile devices 100 are established. Due to the call setup time, an "always on" connection is established for the GPRS/UMTS networks. That is, once the connection is established, it remains "on" even when the MS 100 is not communicating with the public data network until it is disconnected by the MS 100. With these types of connections, the mobile operators that provide the services to the mobile devices are faced with a large amount of equipment that will potentially be deployed if the mobile device maintains the "always on" connection.

SUMMARY OF THE INVENTION

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

Accordingly to an exemplary, non-limiting formulation of the present invention, a telecommunication system is provided. The telecommunication system includes a servicing node, a gateway node connecting the servicing node to a data network, and a control node virtualizing the connection of the servicing node to the data network when the connection is inactive for a predetermined period of time.

According to yet another exemplary, non-limiting formulation of the present invention, a control node virtualizing connections to the data network is provided. The control node includes a servicing interface communicating to a servicing node. The control node further includes a gateway interface communicating to a gateway node that connects the servicing node to a data network, a memory storing control information of inactive connections to the data network, and a processor processing and generating requests to and from the servicing node and the gateway node.

According to yet another exemplary, non-limiting formulation of the present invention, a method of establishing a connection to a data network is provided. The method includes requesting a connection to the data network by a servicing node, connecting the servicing node to the data network via a gateway node, and virtualizing, by a control node, the connection of the servicing node to the data network.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF EXEMPLARY, NON-LIMITING EMBODIMENTS

In the following detailed description, reference will be made to the accompanying drawings, in which analogous functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense, Additionally, the various embodiments of the invention as described may be implemented in the form of software running on a general purpose computer, in the form of a specialized hardware, or combination of software and hardware.

In an exemplary, non-limiting embodiment of the inventive concept, the operator is provided with less equipment i.e., with smaller wireless nodes or with a lower number of wireless nodes. In an exemplary embodiment of the inventive concept, resources are dynamically allocated based on need. Accordingly, the operators need only to account for the percentage of users that will be using their mobile devices to connect to the data network at any given point in time i.e., for the user that require resources to pass traffic to and/or from a data network. The user is in an active state when traffic is being passed such as requesting data from the data network or obtaining the data from the data network. The rest of the users are in an inactive state. In the inactive state, the user does not pass any traffic to and/or from a data network. In the exemplary, non-limiting embodiment of the inventive concept, the inactive connections are virtualized. That is, the user may still obtain access to the data network when needed but at the same time, the user is not using resources of the wireless node, as explained in greater detail below. As a result, the resources of the wireless nodes are only used by mobile devices in active sessions. Accordingly, the wireless nodes need to accommodate only a percentage of the overall data sessions such as "always on" data sessions.

More particularly, in an exemplary, non-limiting embodiment of the inventive concept, a bearer session is established with each subscriber. However, user plane resources in the wireless node are released for inactive sessions. That is, the connections of the inactive users are virtualized in a sense that the bearer connection is maintained but the resources of the wireless nodes are not used or are released, as described in greater detail with reference to FIGS. 5A and 5B.

According to an exemplary, non-limiting embodiment of the inventive concept, a system includes one or more devices, one or more nodes connecting the devices to a public network such as internet, and a control component. The control component controls the connections of the devices to the connection nodes. In particular, the control component virtualizes the inactive connections of the devices. That is, when a device does not pass traffic to the public network, control information relating to the connection is deleted from the one or more connecting nodes and is stored in the control component, thereby releasing the resources of the one or more connecting nodes. When the device decides to pass traffic to the data network, the control component returns the control information to one or more of the connecting nodes, thereby establishing an active connection quickly and transparently for the user. The control component may be incorporated into the connecting node or it may be a physically separate node.

The control component may be software instructions that are embodied on a computer-readable media. As used herein, one of skill in the art will appreciate that "computer-readable media" may include a diskette, a tape, a compact disc, an integrated circuit, a cartridge, a remote transmission via a communications circuit, or any other similar medium useable by computers. For example, to distribute the control component, the supplier might provide a diskette or might transmit the instructions for performing predetermined operations in some form via satellite transmission, via a direct telephone link, or via the Internet.

Figure 2:
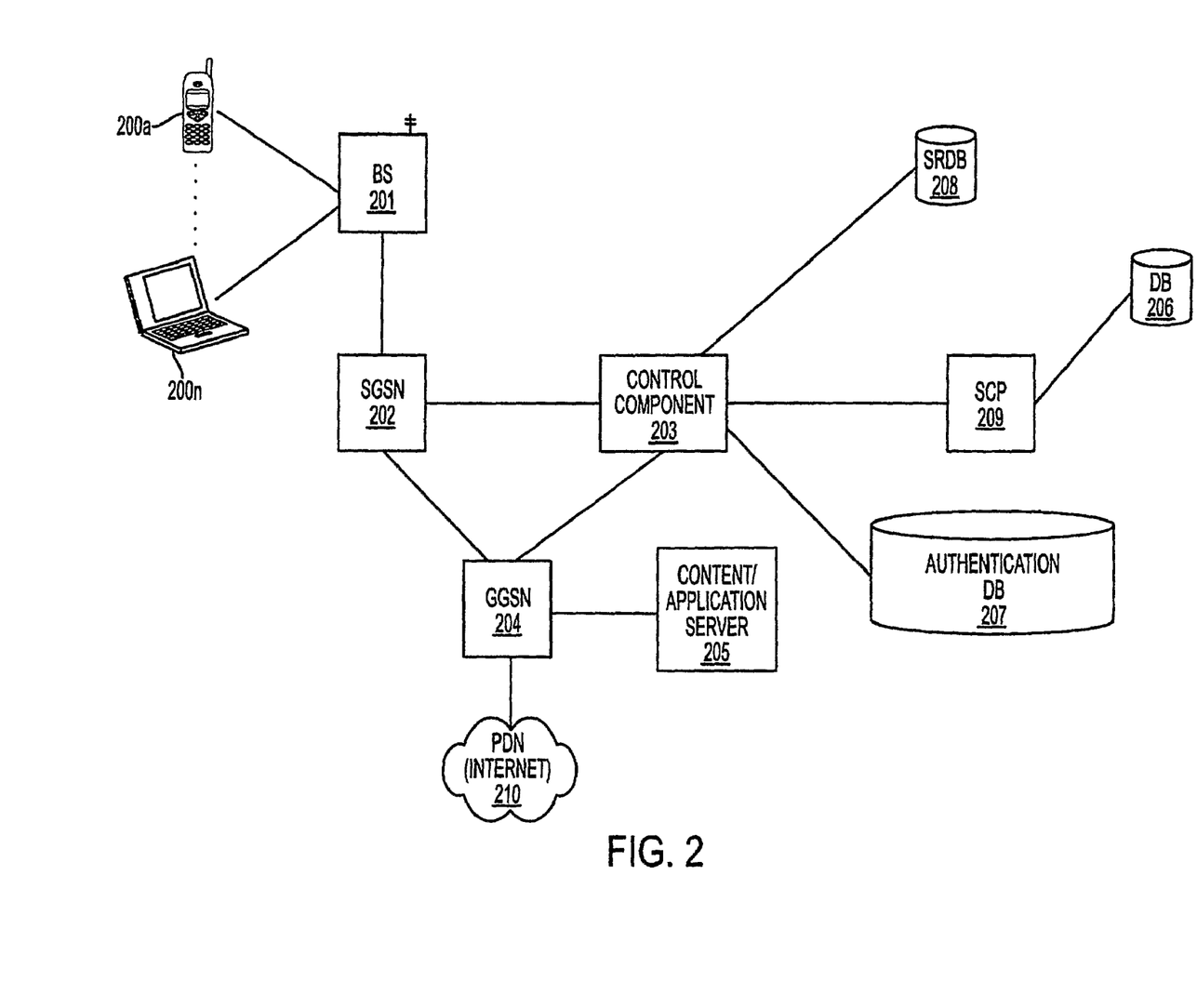
FIG. 2 is a block diagram illustrating a telecommunication system according to an exemplary, non-limiting embodiment of the present invention.

In another exemplary embodiment of the inventive concept depicted in FIG. 2, the UMTS includes mobile devices 200a, . . . 200n, which are connected to the network by communicating with a base station (BS) 201 via UMTS, for example. The base station 201 is connected to the serving GPRS supporting node (SGSN) 202. The SGSN 202 establishes a packet data protocol (PDP) context session (a bearer session) by communicating with a control component 203. The control component 303 may be a server, a computer, or any other type of gateway controller.

The control component 203 controls connections of the subscribers to the data network. That is, the control component 203 communicates with the GGSN 204 to establish the PDP context session. The GGSN 204 is connected to a content/application server 205 for providing the mobile device 200a . . . 200n with various tunes, games, and other applications provided by the service provider. To obtain this information, the mobile device needs only to connect to the network of the operator (the network of the service provider) and need not connect to the data network.

The control component 203 also manages resources of the wireless network node such as the GGSN 204. The control component 203 allocates and reallocates resources of the wireless network node based on whether the subscriber is actively receiving or transmitting data from and to the public network. If a subscriber is inactive for a predetermined period of time, the resources of the wireless network node are released and the subscriber looses its active session.

The control component 203 has a list of the devices that are virtually connected in a PDP context session. The state information can be held in the GGSN 204 or in the control component 203 or a database 206 without using the resources required by the fast path for bearer traffic. The GGSN 204 will still allocate IP addresses to the PDP context by connecting to the SGSN 202 but it will save the resources only for those active PDP contexts passing traffic.

Whenever any of these virtually listed PDP contexts become active (e.g. when there is traffic being sent by the mobile terminal or information sent by the server to the mobile device), the PDP context will be taken out of the virtual list to the active list and the user plane resources will be re-allocated to the PDP context session by the GGSN 204 for traffic handling. In an exemplary embodiment of the inventive concept, the latency for the transition from virtual to active state is less than 0.5 seconds. The latency may be determined by an amount of time it takes for the control component 203 to move the required information back to the GGSN 204 so as to establish an active connection.

That is, the PDP context state information is moved to the control component 203 and the GGSN 204 holds a minimum set of the PDP context state information when a configurable time ($t_{move}$) is reached.

Accordingly, the resources of a node such as SGSN, PDSN, or a packet service gateway are dynamically allocated for those active PDP contexts (data sessions) that require resources to pass the traffic. On the other hand, the inactive PDP contexts that do not pass any traffic (after some predefined period of time) are switched into the virtualized state. A timer is set to determine when the established PDP context session will be taken off the active list and be placed into the virtual list of states. Whenever any of these virtually listed PDP context become active (e.g., when there is traffic being sent by the mobile terminal or information sent by the server to the user), it will be taken out of the virtual list of states to the active list and the necessary resources will be allocated to the PDP context (or data session) to pass traffic.

In an exemplary embodiment depicted in FIG. 2, the control component 203 holds information for the inactive connections and when the connection becomes active, the control component 203 transfers the control information to the GGSN 204 for active data transfer.

As further depicted in FIG. 2, the control component 203 is also connected to a service control points 209 that may include a database 206, an authentication database 207, and a subscriber database 208, of the public network such as PDN. The control component 203 may set up connections with anyone of the authentication database 207, the subscriber database 208, and the service control point (SCP) 209 that keep information about the subscriber using various protocols such as SOAP, LDAP, SQL, RADIUS, Diameter and/or CAMEL. These protocols are provided by way of an example only and not by way of a limitation. One of ordinary skill in the art would readily appreciate that any other known techniques currently known or later developed for communication with databases and points that store subscriber information are within the scope of the invention.

For example, if the mobile subscriber is prepaid, the prepaid dialogue with a service control point (SCP) 209 for the PDP Context is set up. In the conventional techniques, the set up connection will be kept active for the duration of the PDP context. In an exemplary, non-limiting embodiment, however, when the PDP Context will become inactive, the connection to the SCP 209 will be terminated. When needed, the connection to the SCP will be re-established. Accordingly, the control component 203 also disconnects inactive connections from the service control point, thereby further minimizing resources for the mobile operator(s). This provides the mobile operator with the ability to scale the network according to the number of active prepaid PDP context sessions passing traffic as compared to the number of prepaid PDP contexts sessions.

In an exemplary embodiment of the inventive concept depicted in FIG. 2, the database 206 stores information relating to the prepaid mobile devices and the SCP 209 determines whether a particular mobile device has enough of the prepaid moneys to download a particular file from the data access network and/or to maintain an active data session. That is, the SCP 209 may act as a prepaid server and handle user account information. The authentication database 207 authenticates a mobile device that attempts to connect to the public session. In addition to the authorization, the authentication database 207 may also handle user account information i.e., how much money the user spent based on the length of the data access or based on the bytes downloaded and/or uploaded, and so on. The subscriber database 208 may store user and service information such as the subscriber profile. The subscriber profile may include information such as what services the subscriber signed up for e.g., push to talk service, voice over IP (VoIP) service and so on.

Therefore, in an exemplary embodiment of the inventive concept, a dual architecture is provided. The control component handles the control plane and the GGSN handles the user plane. In the conventional techniques, the active and inactive connections are handled by the GGSN via tunnels established between the SGSN and the GGSN. In the exemplary embodiment of the present invention, however, the GGSN handles, via communication channels with the SGSN, only active data connections and the control component holds the control information for the inactive connections i.e., the inactive connections are virtualized.

Figure 3:
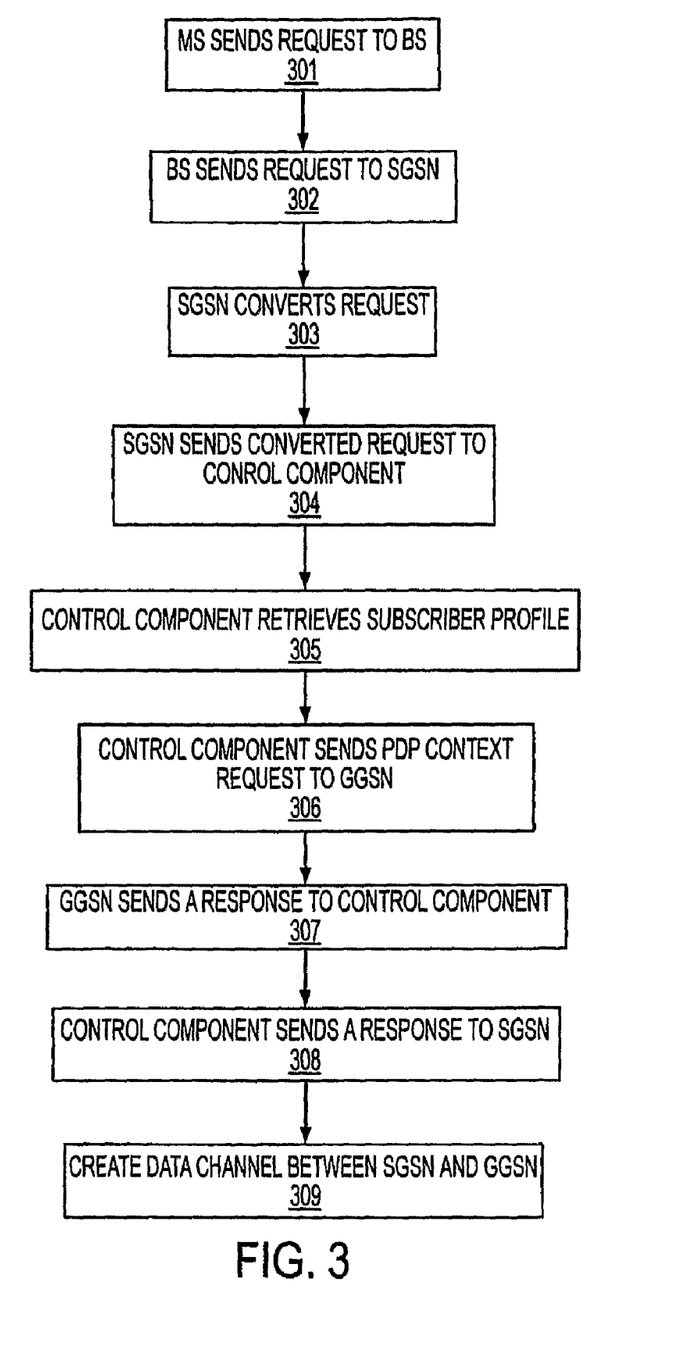
FIG. 3 is a flow chart illustrating establishing an initial session of the mobile device with a data network according to an exemplary, non-limiting embodiment of the present invention.

In particular, as depicted in FIG. 3, the control component provides the initial session control. The mobile device (MS) sends a request message to the base station (BS) requesting connection to the data network, in operation 301. The BS forwards the message to the SGSN in operation 302. In operation 303, the SGSN converts the received request to the PDP context request and sends the converted request to the control component, in operation 304. The control component receives all of the PDP context requests from the SGSN. In operation 305, the control component retrieves the subscriber profile of the requesting user from a service control point or from a database and creates a PDP context request message, which is sent to the GGSN, in operation 306. For the prepaid subscriber, for example, the control component may query the service control point to determine if the user has enough credit to access the service. The control component also receives all of the accounting request messages from the GGSN and communicates with the service control point to provide the requested accounting information to the GGSN. The GGSN sends a response back to the control component in operation 307 and the control component creates a PDP context response and sends it to the SGSN in operation 308.

That is, the control component creates a control channel such as a tunnel in the GPRS tunneling protocol (GTP), between the SGSN and itself. The control component also establishes a control channel between the GGSN and itself to communicate any changes in the control information to the GGSN.

The SGSN uses the information in the PDP context response received in operation 308 to create a data channel such as a GTP user or data tunnel, between the GGSN and itself, in operation 309. In other words, a control channel is established between the control component and the SGSN for all control information and a user channel is established between the SGSN and GGSN for passing traffic between the mobile device and the public network.

The control component may also intelligently distribute the PDP contexts to various GGSNs based on a load of each GGSN and/or the subscriber profile. In other words, the control component balances the load of the traffic between multiple GGSNs.

Figure 4:
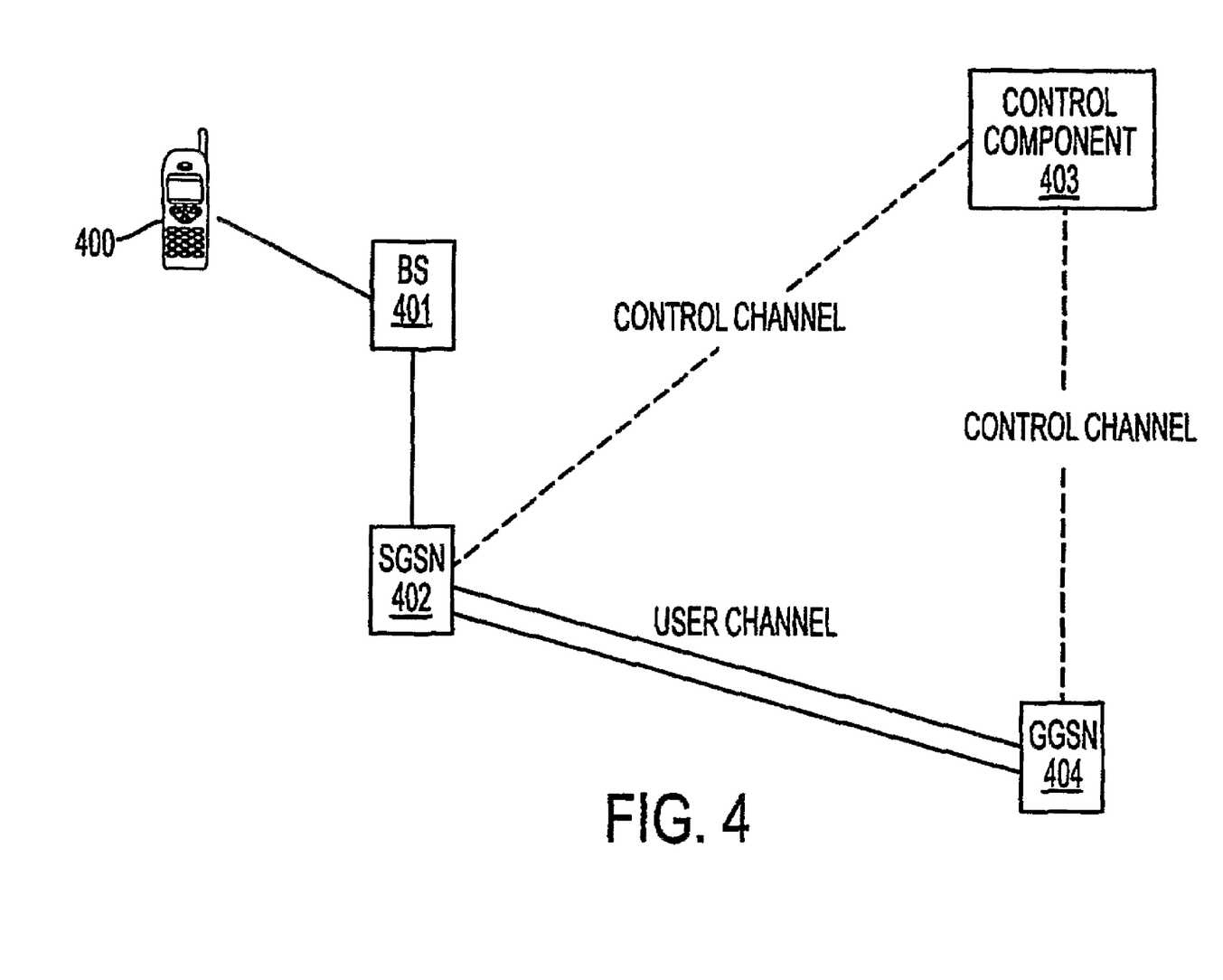
FIG. 4 is a block diagram illustrating established communication channels between components of the telecommunication system according to an exemplary, non-limiting embodiment of the present invention.

The control component also provides a full session control when the initial session is established. The control component receives all of the control messages via the established control channel. In particular, the control component receives create PDP context, update PDP context, and delete PDP context requests. The control component then sends the PDP requests to the GGSN. In particular, the PDP requests are distributed amongst various GGSNs based on their loads and subscriber profiles. As depicted in FIG. 4, the user device 400 connects to the SGSN 402 via the base station (BS) 401. A control channel such as control GTP tunnel (GTP-C), is established between the SGSN 402 and the control component 403. The control component 403 also establishes a control channel such as GTP-C, with the GGSN 404 to send control information. The SGSN also establishes a user or data channel such as a user GTP tunnel (GTP-U), for transmitting data of the PDN with the GGSN 404.

By way of a variation, an additional control channel may also be established between the SGSN and GGSN. This control channel may control the active sessions, as opposed to having the control component handle all of the control information.

Next, one of the methods to virtualize the PDP connections is described with reference to FIGS. 5A and 5B. Each PDP context connection is monitored by the GGSN, which sets a reference time period (a threshold time) for monitoring inactivity of the PDP context sessions. When the PDP context is idle for some time, the PDP context is deleted from the GGSN and is virtualized, as explained in greater detail with reference to FIG. 5A.

Figure 5A:
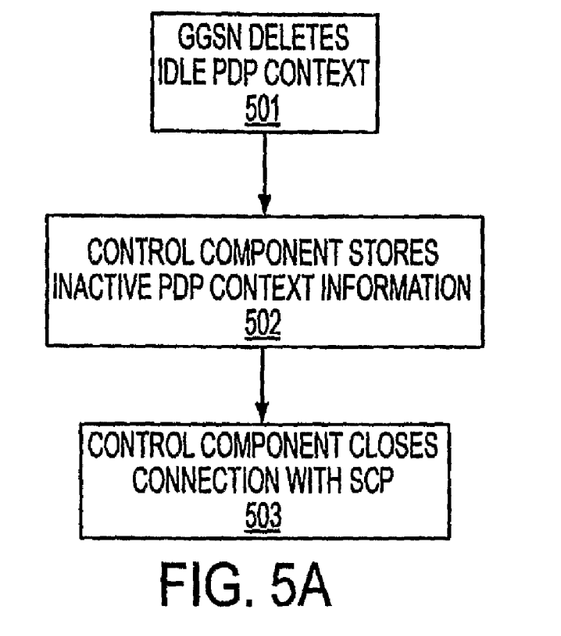
FIGS. 5A and 5B are flow charts respectively illustrating virtualizing a data session and re-establishing an active data session from the virtualized state according to an exemplary, non-limiting embodiment of the present invention.
Figure 5B:
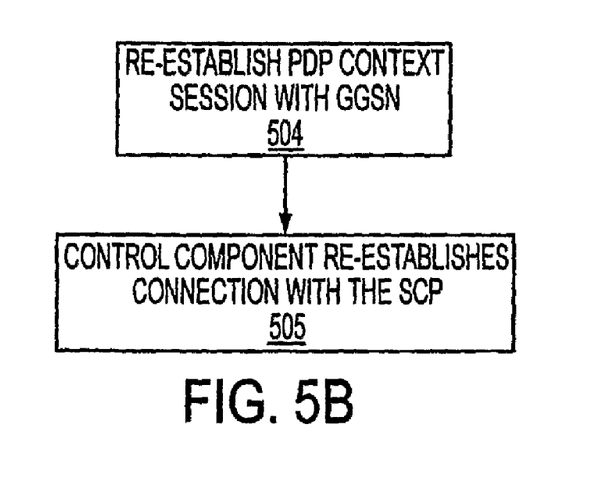

As depicted in FIG. 5A, when a PDP context session of the subscriber does not send or receive data for the reference time period, the PDP context session is deleted from the GGSN, in operation 501. The control information for the PDP context session deleted from the GGSN is transferred to the control component, in operation 502. The control component may have a list for storing control information of inactive connections. Accordingly, the control information of the inactive PDP session will be transferred to the inactive connections list of the control component. In particular, the control information may include an IP address of the mobile device, services used prior to the inactivity, last tunnel used, the last/next sequence number that is used between the SGSN and the GGSN, the charging information in order to re-established this information when the call is active again, binding information as to which Gn and Gi card, the session was allocated to and so on.

One of ordinary skill in the art would recognize that the control information described above is provided by way of an example only and not by way of a limitation. One of ordinary skill in the art would also recognize that at least in part the control information will depend on a communication standard or protocol used. The present invention encompasses various communication protocols and standards currently known or further developed, as explained above. Accordingly, any and all control information, currently known or later developed, that allows a node to maintain a connection with a data network is within the scope of the invention.

For the prepaid subscribers, in the conventional techniques, once the PDP context connection is established (e.g., a data tunnel between the SGSN and the GGSN for the PDP context), the connection to the service control point storing the billing information is also established. Both connections are kept open for the duration of the PDP context session. In an exemplary embodiment of the present invention, however, the control component closes the connection to the service control point (SCP) for the inactive PDP context session, in operation 503. Accordingly, this provides additional cost benefits for the service control points that do not need to maintain connections for the inactive PDP context sessions.

Establishing an active PDP context session from a virtual state is described with reference to FIG. 5B. When activity is detected i.e., when the mobile subscriber wishes to send or receive data from the GGSN, control component re-establishes the PDP context session with the GGSN, in operation 504. That is, the control component sends to the GGSN the control information of the inactive PDP context session from the control component's inactive list. The control component also re-establishes a connection with the service control point (SCP), if the subscriber is prepaid, in operation 505. Specifically, the control components sends a message to the service control point as if a new call is to be established. In this message, the control component includes billing information stored in the virtualization list of the control component. As a result, authentication may not necessarily be needed since this is not truly establishing a new call, since all the information is stored in the virtualization list. Accordingly, an active connection is established.

Figure 6:
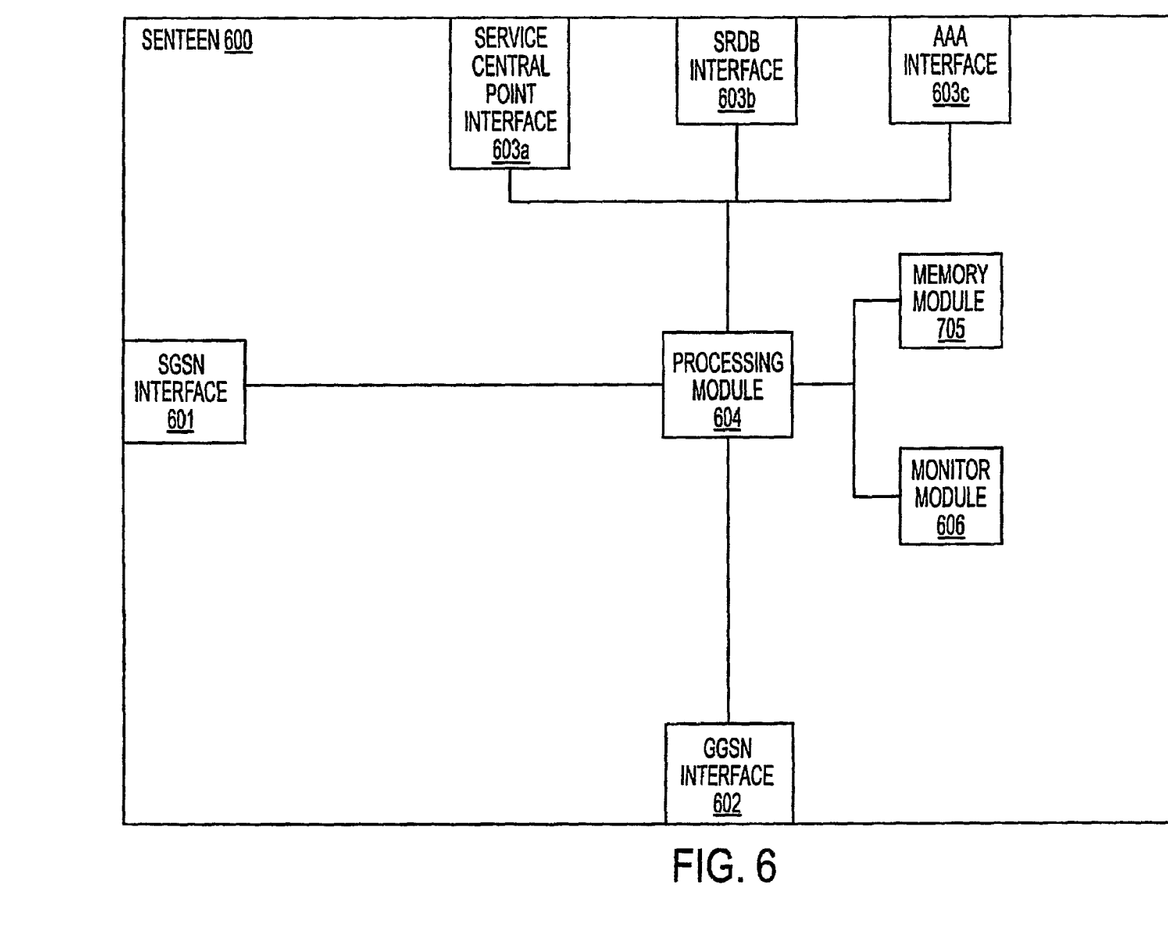
FIG. 6 is a block diagram of a control component according to an exemplary, non-limiting embodiment of the present invention.

Exemplary modules or components of a control component 600 according to an exemplary embodiment of the present invention are described with reference to FIG. 6. As depicted in FIG. 6, the control component 600 includes an SGSN interface 601, a GGSN interface 602, and a service control point interface 603a, a SRDB interface 603b, and an AAA interface 603c. Interfaces 601 and 602 convert messages to a format such as GTP for communication with the nodes of the GPRS. Interfaces 603a to 603c convert messages to any one of the following protocols: INAP, RADIUS, Diameter Camel II, Camel III, SOAP, XML API and so on. These protocols are provided by way of an example only. One of ordinary skill in the art would readily recognize that the interfaces 603a to 603c may convert messages to other protocols currently known or later developed for communicating with a service control point (SCP). Moreover, the control component 600 includes a processing module 604 that processes requests/responses from and to the SGSN, the GGSN, and the service control point. The processing module 604 also generates requests for the service control point and the GGSN.

The control component 600 further includes a memory module 605 that stores the inactive list and a monitor module 606 that monitors the state of the PDP context connections. Since the control plane is between the control component and the SGSN and between the control component and the GGSN, the monitor module 606 monitors the state of the PDP context connections based on the received control information. Accordingly, control component 600 handles the control of the PDP context connections and the GGSN only needs to handle the user plane (data transfer) of the PDP context connections.

It is not necessary that the memory module and the processor module be physically located in the same place. That is to say, it is foreseen that the processor module and the memory might be in different physical pieces of equipment or even in geographically distinct locations. For example, the control component may be embodied as a separate node or may be incorporated into a servicing or gateway node. The memory module may be a separate, geographically distinct database or a memory with the node.

The above described protocols and standards are provided by way of an example only and not by way of a limitation. One of ordinary skill in the art would readily recognize that the above-described exemplary techniques of virtualizing an existing connection may readily apply to other communication methods that use different protocols and standards. Moreover, the above-described exemplary techniques may be applied to the protocols and communication standards currently known or later developed.

For example, may various communication nodes are within the scope of the invention such as home agent, media gateway, media gateway controller, and data source node (DSN), call session control function (CSCF) node, and many other nodes such as nodes of the data network that handle user traffic.

By virtualizing inactive connections, the number of nodes (with the same capacity) that is required to be deployed for operators connecting devices to a service such as internet may be reduced. Also, the number of the service control points for the prepaid subscribers may be reduced. According to an exemplary embodiment of the present invention, a control component or node has the intelligence to take inactive data sessions that do not pass any traffic for a predetermined time into the virtualized state, so that the nodes such as SGSN do not need to re-establish the connection when there are data to be sent or received by the subscriber(s), thereby providing an intelligent and dynamic way to allocate the user plane resources in the node based on demand.

By way of an example, not all of connections that are established will have traffic passing through them. Generally, it is of a certain percentage (e.g. approximately 10% to 50%) of the total connections that will be active, even during peak hours. The number of nodes needed to provide the connections are number of subscriber divided by a capacity of each node (# of nodes=[# of subscribers/capacity of the node]). Accordingly, for example, instead of providing 24 wireless nodes, each of capacity 192K (for example), for 4.5 million subscribers, three wireless nodes for 4.5 million subscribers are needed when ten (10%) percent of the PDP contexts (data sessions) actively pass data; 12 wireless nodes for 4.5 million subscribers are needed when fifty percent of the PDP contexts (data sessions) actively pass data traffic. The table below provides an example of the number of wireless nodes (WN) needed for a number of subscribers indicated in parenthesis with a percent of active PDP sessions.

| HW item | 10% active PDP (450 000) | 30% active PDP (1 350 000) | 60% active PDP (2 700 000) | 100% active PDP (4 500 000) |
| --- | --- | --- | --- | --- |
| WN | 3 | 8 | 15 | 24 |

As a result, the costs are reduced and equipment is optimized.

The mobile operator(s) is provided with a flexible and an optimal way to dimension the number of the nodes required for the connections such as the "always on" deployment. For example, if the mobile operator wants to support 4.5 million PDP context sessions with 10% of the PDP context sessions passing data traffic during busy hour: in the conventional techniques, 24 wireless nodes, at a minimum, are required; according to an exemplary embodiment of the present invention, only 3 wireless nodes are needed, at a minimum, for ten percent (10%) of the established connections actively running traffic, as shown in the chart above.

The above and other features of the invention including various novel operations and a system of the various parts and components have been particularly described with reference to the accompanying drawings and pointed out in the claims. It will be understood that the particular process and construction of parts embodying the present invention is shown by way of illustration only and not as a limitation of the invention. The principles and features of this invention may be employed singly or in any combination in varied and numerous embodiments without departing from the spirit and scope of the invention as defined by the appended claims.

What is claimed is:

1. A control node for virtualizing connections to a data network, the control node comprising:
   a servicing interface for communicating to a servicing node;
   a gateway interface for communicating to a gateway node that connects the servicing node to the data network;
   a memory; and
   a processor for processing and generating requests to and from the servicing node and the gateway node,
   wherein the control node is configured to virtualize a data connection of the servicing node to the data network when the data connection is inactive for a predetermined period of time by maintaining a bearer connection between the servicing node and the data network, instructing the gateway node to delete control information related to the inactive connection between the servicing node and data network, and storing the deleted control information in the memory.

2. The control node according to claim 1, wherein, the inactive connection is a connection in which no traffic is passed to and from the data network for a predetermined period of time.

3. The control node according to claim 2, wherein, the control node is configured such that when the inactive connection requests to activate the inactive connection, control information for the inactive connection is sent from the memory of the control node to the gateway device via the gateway interface.

4. The control node according to claim 1, further comprising a service control interface for connecting the control node to a service control point that stores subscriber information for a prepaid user, wherein, for the inactive connection, the control node is configured to terminate connection to the service control point via the service control interface, and wherein, when the inactive connection is switched to an active state, the control node is configured to re-establish a connection to the service control point via the service control interface.

5. The control node according to claim 1, further comprising: a monitor module for monitoring state of connections, wherein during an active connection data is passed between the data network and the servicing node and wherein during the inactive connection, no data is passed between the data network and the servicing node for a predetermined period of time.

6. The control node according to claim 5, wherein the processor is configured to establish a first control channel with the servicing node via the servicing interface and wherein control information of the data connection is transmitted from the servicing node to the control node in the first control channel.

7. The control node according to claim 6, wherein the processor is configured to cause the control node to establish a second control channel with the gateway node via the gateway interface, wherein the control information is transmitted in the second control channel only when the data connection is active, and wherein the processor is configured to cause the control node to store the control information in the memory when the data connection is inactive.

8. The control node according to claim 7, wherein, the control node is configured such that when the inactive connection is to become active, the processor causes the control node to send the control information of the data connection to the gateway node, which has a data channel with the servicing node, and the data channel carries data of the data network.

9. The control node according to claim 8, wherein the data network is internet.

10. A method of establishing a connection to a data network, comprising:
  requesting a data connection to the data network by a servicing node;
  connecting the servicing node to the data network via a gateway node; and
  virtualizing the connection of the servicing node to the data network when the data connection is inactive for a predetermined period of time by maintaining a bearer connection between the servicing node and the data network, releasing resources of the gateway node for the data connection, deleting control information for the data connection from the gateway node, and storing the deleted control information in a virtualization list of a control component.

11. The method according to claim 10, further comprising:
  receiving a request to establish the data connection and converting the request to a packet data protocol context request;
  authenticating an entity requesting the data connection by connecting to a service control point;
  if the entity is authenticated, sending the control information to the gateway node;
  receiving a response from the gateway node by the servicing node; and
  establishing a data tunnel between the servicing node and the gateway node,
  wherein the data of the data network is transmitted in the data tunnel, and
  wherein the data connection is inactive when the entity does not transmit or receive data for a predetermined period of time.

12. The method according to claim 11, wherein a first control tunnel is established between the servicing node and the control component and a second control tunnel is established between the control component and the gateway node, wherein the control information is transmitted only in the first and second control tunnels, wherein the control information is transmitted in the second control tunnel only when the data connection is in an active session by transmitting or receiving data from the data network.

13. A telecommunication system comprising:
  a servicing node for controllably connecting connected to one or more mobiles devices;
  a gateway node for connecting the servicing node to a data network; and
  a control component for controlling connections of the one or more mobile devices to the servicing node and for virtualizing a connection of the servicing node to the data network when the connection between the servicing node and data network is inactive for a predetermined period of time by maintaining a previously established bearer connection between the servicing node and control component data network when the data connection between the servicing node and data network is inactive for a predetermined period of time, and by the control component deleting control information in the gateway node related to the inactive data connection between the servicing node and data network, and for storing the deleted control information in the control component.

14. The telecommunication system according to claim 13, wherein the control component is a physically separate node.

15. The telecommunication system according to claim 13, wherein the virtualized connection is activated by moving the stored control information from the control component to the gateway device.

16. The telecommunication system according to 13, wherein the servicing node and gateway node for further establishing a data channel is established between the servicing node and the gateway node to pass traffic between the data network and a mobile device of the one or more mobile devices.

17. The telecommunication system according to 16, wherein the control component for further establishing a first control channel is established between the control component and the servicing node and for transmitting wherein control information for establishing a connection of a mobile device of the one or more mobile devices to the data network is transmitted in the first control channel.

18. The telecommunication system according to claim 17, wherein the control component and the gateway node for further establishing a second control channel is established between the control component and the gateway node and wherein the control component for transmitting control information for establishing an active data session to the gateway node is transmitted in the second control channel to the gateway node.

19. The telecommunication system according to claim 18, wherein the gateway node for further closing the active data session and deleting the active data session, control information when the mobile device of the one or more mobile devices does not transmit or receive data from the data network for a predetermined period of time, the active session is closed, the control information is deleted from the gateway node and is stored in the control component for further storing the active data session, control information as a virtualized connection.

20. The telecommunication system according to claim 13, further comprising a service control point for storing subscriber information of prepaid users, and wherein the control component for further establishing establishes a connection to the service control point, and wherein, when the connection of the servicing node to the data network is virtualized, the control component closing closes the connection to the service control point when the connection of the servicing node to the data network is virtualized.

21. The telecommunication system according to claim 13, wherein the control component for further sending stored control information to the gateway node to establish an active data session when the mobile device in the virtualized connection requests at least one of to pass data to the data network or to receive data from the data network, control information from the control component is sent to the gateway node establishing an active data session and establishing wherein the control component establishes a connection to the service control point.

22. The telecommunication system according to claim 13, wherein, when the virtualized connection is being activated by receiving a request to pass traffic to the data network, the control component for further determining determines which of a plurality of gateway nodes will handle the active session and based on said determination passes passing control information stored in the control component to the gateway node determined to handle the active session when a virtualized connection is activated.

23. The telecommunication system according to claim 13, wherein the control component comprising comprises software instructions running on one of the gateway node or the servicing node.

24. The telecommunication system according to claim 13, wherein the control component integrated into one of the gateway node and the servicing node.

* * * * *